(12) United States Patent
Kaliski et al.

(10) Patent No.: US 7,886,345 B2
(45) Date of Patent: Feb. 8, 2011

(54) PASSWORD-PROTECTION MODULE

(75) Inventors: Burton S. Kaliski, Wellesley, MA (US);
Magnus Nyström, Bedford, MA (US)

(73) Assignee: EMC Corporation, Hopkinton, MA (US)

( * ) Notice: Subject to any disclaimer, the term of this patent is extended or adjusted under 35 U.S.C. 154(b) by 1618 days.

(21) Appl. No.: 11/172,378

(22) Filed: Jun. 30, 2005

(65) Prior Publication Data
US 2006/0041759 A1    Feb. 23, 2006

Related U.S. Application Data

(60) Provisional application No. 60/584,997, filed on Jul. 2, 2004, provisional application No. 60/591,672, filed on Jul. 28, 2004, provisional application No. 60/620,222, filed on Oct. 19, 2004.

(51) Int. Cl.
G06F 21/00    (2006.01)

(52) U.S. Cl. ............... 726/6; 726/5; 726/10; 713/155; 713/183; 380/281; 380/283

(58) Field of Classification Search .............. 380/259, 380/283, 281; 713/153, 155, 169, 183; 705/67, 705/72; 726/10, 5, 6
See application file for complete search history.

(56) References Cited

U.S. PATENT DOCUMENTS

| 5,241,599 | A | * | 8/1993 | Bellovin et al. ............. 713/171 |
| 5,757,918 | A | * | 5/1998 | Hopkins ..................... 705/67 |
| 5,872,917 | A |   | 2/1999 | Hellman |
| 5,961,593 | A |   | 10/1999 | Gabber et al. |
| 6,141,760 | A |   | 10/2000 | Abadi et al. |
| 6,880,079 | B2 | * | 4/2005 | Kefford et al. ............. 713/155 |
| 7,295,832 | B2 | * | 11/2007 | Hewel ........................ 455/411 |
| 7,363,494 | B2 | * | 4/2008 | Brainard et al. ............ 713/168 |
| 2004/0034771 | A1 |   | 2/2004 | Edgett et al. |
| 2006/0291661 | A1 | * | 12/2006 | Ramzan et al. ............. 380/277 |

OTHER PUBLICATIONS

Menezes et al., "Handbook of Applied Crytography, Chanllenge-Response Identification (Strong Authentication)", Handbook of Applied Cryptography, CRC Press Series on Discrete Mathematices and its Applications, Boca Raton, FL, CRC Press, US, 1997, pp. 397-404, 490, XP002282273.

Menezes A et al., "Customized and Zero knowledge identification protocols", Handbook of Applied Cryptography, Dec. 31, 1996, pp. 404-417, XP002258405.

(Continued)

Primary Examiner—Matthew B Smithers
Assistant Examiner—Paul Callahan
(74) Attorney, Agent, or Firm—BainwoodHuang (57) ABSTRACT

A method of protecting a password being used to establish interaction between a user and an application includes detecting a request for the password from the application by receiving a notification from the user indicating the request. The method further includes combining the password with information identifying the application, so as to produce a protected password, and authenticating to the application using the protected password. The method may also include a mutual authentication capability between user and the application.

28 Claims, 3 Drawing Sheets

OTHER PUBLICATIONS

Halevi S et al., "Public-Key Crytography and Password Protocols", ACM Confernece on Computer and Communications Security, Nov. 2, 1998, pp. 122-131, XP000986777.

Gong L et al., "Protecting Poorly Chosen Secrets From Guessing Attacks", IEEE Journal on Selected Areas in Communications, IEEE Inc. New York, US, vol. 11, No. 5, Jun. 1, 1993, pp. 648-656, XP000399660.

Abadi, et al., "Strengthening Passwords," SRC Technical Note 1997-033, Digital Equipment Corporation, Sep. 4, 1997 (revisions on Dec. 16, 1997).

Chou, et al., "Client-Side Defense Against Web-Based Identity Theft," Manuscript, no date. (Online search indicates that paper was published at 11th Annual Network and Distributed System Secutiry Symposium (NDSS '04), San Diego, Feb. 2004. http://crypto.stanford.edu/SpoofGuard/webspoof.pdf.

Emigh, Aaron, "Anti-Phishing Technology," Report produced in conjection with the United States Secret Service San Francisco Electronic Crimes Task Force, Oct. 26, 2004. http://www.soe.ucsc.edu/classes/ism101/Spring05/slides/ emigh_report.pdf.

Franks, et al., "An Extension to HTTP: Digest Access Authentication," IETF RFC 2069, Jan. 1997. http://ftp.ics.uci.edu/pub/ietf/http/rfc2069.txt.

Kedem, et al., "Brute Force Attack on UNIX Passwords with SIMD Computer" Proceedings of the 8th USENIX Security Symposium, 1999.

Ross, et al., "A 'Simple' Solution to the Unique Password Problem," Presentation, no date.

Vasco, "Avoid-Phishing—Use Strong Authentication," White Paper, Mar. 2004. http://vasco.com/.

* cited by examiner

PASSWORD-PROTECTION MODULE

CROSS REFERENCE TO RELATED APPLICATIONS

This application claims benefit of the following Patent Applications:

U.S. Provisional Patent Application Ser. No. 60/584,997, filed Jul. 2, 2004.

U.S. Provisional Patent Application Ser. No. 60/591,672, filed Jul. 28, 2004.

U.S. Provisional Patent Application Ser. No. 60/620,222, filed Oct. 19, 2004.

BACKGROUND OF THE INVENTION

The present invention relates to security systems for controlling access to computer systems and networks, and more particularly, to techniques for protecting password-based security systems.

Unauthorized disclosure of private information, identity theft, and financial damages are often the result of users unknowingly providing sensitive information to un-trusted or malicious applications. Users are, through increasingly elaborate methods, fooled to believe that the application to which they are providing the sensitive information is trustworthy. There are several reasons for the success rate of these attacks, such as the users' willingness to accept applications as trustworthy for convenience, the level of sophistication of the attacks, among others.

"Phishing" is a well-known term for the fraudulent method of tricking end-users to divulge personal information to fraudster-controlled applications, through legitimate-looking requests that include instructions to contact some well-known service provider's application, when in reality the instructions will lead to a contact with an application under the fraudster's control. The intent of the fraud is to acquire sensitive information from the recipients of the requests by making them believe they have contacted a legitimate application. The sought-after information can be user credentials such as static passwords, account information, credit card information, etc. The term "Phishing" relates to the fraudulent method—i.e., the attacker is fishing for information, by sending out bait, for example an e-mail. The spelling follows in the tradition of earlier fraud schemes, in particular a computer telephony fraud—"Phone Phreaking," that occurred in the 1970s and 1980s.

Phishing is an increasingly severe problem for application providers and end users, and a reason not only for identity theft but also loss of personal and corporate revenues, and in the extreme loss of confidence in the Internet as a viable media for personal financial transactions.

One prior art approach to dealing with phishing attacks is filtering, for which software on the user's computer detects requests for the user's password or other form data, and warns the user or prevents the user from providing the password to untrustworthy applications. However, this is only a partial solution, because it is often difficult for the user or the user's computer to determine whether an application is trustworthy, and users are often too willing to accept new applications as trustworthy just for convenience, even when they should know better. In effect, the user's computer needs to manage a "trust list," and as is well known from public-key infrastructure (PKI) implementations, trust lists are especially challenging to manage.

Another prior art approach that one may consider for dealing with phishing attacks is to apply cryptography. However, cryptography has been shown to be insufficient. Server authentication with public-key cryptography, for instance by the SSL protocol, helps to ensure that the user's computer has a secure session and prevents eavesdropping, but the secure session may be with an untrustworthy application.

Mutual authentication with symmetric cryptography is another potential prior art approach for dealing with phishing attacks. This approach has proven to be somewhat better than the others described above, because the application requesting information also must demonstrate knowledge of a password, but such a system needs to be carefully designed. Challenge-response protocols based on a key derived from a password (e.g., MS-Chap [Zorn00]) are one approach, but are limited because typical passwords are not cryptographically strong, so a rogue server can potentially recover the password by trial-and-error. Zero-knowledge password protocols and password-authenticated key exchange protocols such as Encrypted Key Exchange (EKE, [Bel92]) and Simple Password-authenticated Exponential Key Exchange (SPEKE, [Jab96]) (which are two of a large number of examples) are better, but they still depend on some filtering of password requests. Otherwise a rogue server can just ask for passwords directly without running the protocol. Moreover, the protocol flows in both cases are different than the straightforward "username/password" exchange, and require more careful integration with common security protocols such as SSL and TLS.

In any case, static passwords are inherently risky, since if the protection does fail, and a password is intercepted, the user can be impersonated. The security is very "brittle" in this sense. Passwords should ideally be changed often; but it may be difficult to change a password securely if the user's computer is being "phished" regularly.

Hardware tokens (e.g., smart cards) and software tokens can also provide some protection to phishing attacks, but such tokens may require special interfaces to a user's computer, or local state. Hence, despite the availability of token-based solutions, password authentication still remains a predominant approach. Downloadable software tokens are increasingly common, but the user must first generally authenticate to a credential provider before downloading the software token—and this itself may be an avenue for a phishing attack.

One-time password devices are better than static passwords as they change automatically, and they are arguably more convenient than hardware and software tokens because they can be employed directly within the "username/password" paradigm, without new interfaces to the user's computer, or local state. However, they are still subject to "real-time" phishing, which is becoming increasingly common. In a real-time phishing attack, the attacker immediately presents the one-time password to the correct application in order to gain access to the user's account.

Moreover, since one-time password authentication is generally unilateral,—i.e., only the user's knowledge of the password is authenticated, not the application's knowledge—the user may well continue to interact with the attacker's application, providing sensitive information. The attacker's application does not even need to access the user's account in order to do this.

Cryptographic techniques can indeed provide mutual authentication; for instance the zero-knowledge protocols mentioned above, or the SHAKE ([Lar01]) protocol. But the latter may involve too many protocol messages to be practical, and both require careful integration with established security protocols. Moreover, both approaches are complicated by the fact that several one-time passwords may be valid at the same time. Either the protocol must be modified so that the server can "commit" to more than one password at a time, or else the user's computer and the server may need to run the protocol multiple times.

SUMMARY OF THE INVENTION

One embodiment of a password-protection module, implemented on, for example, a personal computer, detects that an application is requesting a password (or a passphrase) from a user. This application may be some external entity (an Internet website, for example), to which the user is communicating (via a browser, for example), or it may be a desktop application, or an application running on a device connected to the user's computer. In one embodiment, the password-protection module detects the password request when the user notifies the module. Such notification may include a series of keystrokes entered on a keyboard or keypad, activating a button or switch, or providing a wireless signal (such as radio, sonic, ultrasonic, infrared and other wireless signals known in the art) communicated from the user to the module. Such notification may include establishing communication between a security device and the user's computer platform. Upon receiving the notification, the password-protection module combines the user's password with information identifying the application, and potentially other data, so as to produce a protected password. The information identifying the application may include a URL, an IP address, a name in a certificate, a public key, or combinations of these. In one embodiment, the "combining" of the user's password with information identifying the application includes hashing. The password-protection module then uses the protected password to authenticate to the application. Such authentication may include providing the protected password to the application, or communicating with the application (in a challenge-response protocol) using a derivative of the protected password, or interacting with an authentication authority.

One embodiment of the password-protection module includes a mutual authentication capability, so that in addition to authenticating to the application using the protected password, the password-protection module also determines, based on the password, whether the application is entitled to interact with the user. Some examples of indications of whether the application is entitled to interact with the user include the application demonstrating knowledge of the password or the protected password, and the application interacting with an authentication authority. In this embodiment the password-protection module may not need to receive a notification from the user.

One embodiment of the password-protection module includes detecting a request for the password from an application by receiving a notification from the user indicating the request, then executing a mutual authentication protocol (such as zero-knowledge password protocols, password-authenticated key exchange protocols, and SHAKE) based on the password.

In one aspect, a password-protection module is a computer readable medium with stored instructions adapted for protecting a password being used to establish interaction between a user and an application. The stored instructions include instructions for detecting a request for the password from the application by receiving a notification from the user indicating the request. The stored instructions further include instructions for combining the password with a value identifying the application, so as to produce a protected password. The instructions also include instructions for authenticating to the application using the protected password. In one embodiment, at least a portion of the stored instructions includes a plug-in associated with a browser.

In another aspect, a password-protection module is a computer readable medium with stored instructions adapted for protecting a password being used to establish interaction between a user and an application. The stored instructions include instructions for detecting a request for the password from the application, and for combining the password with information the application, so as to produce a protected password. The stored instructions further include instructions for authenticating to the application using the protected password, and instructions for determining, based on the password, whether the application is entitled to interact with the user. As described above, examples of indications of whether the application is entitled to interact with the user include the application demonstrating knowledge of the password or the protected password, and the application interacting with an authentication authority.

BRIEF DESCRIPTION OF DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENTS

Figure 1:
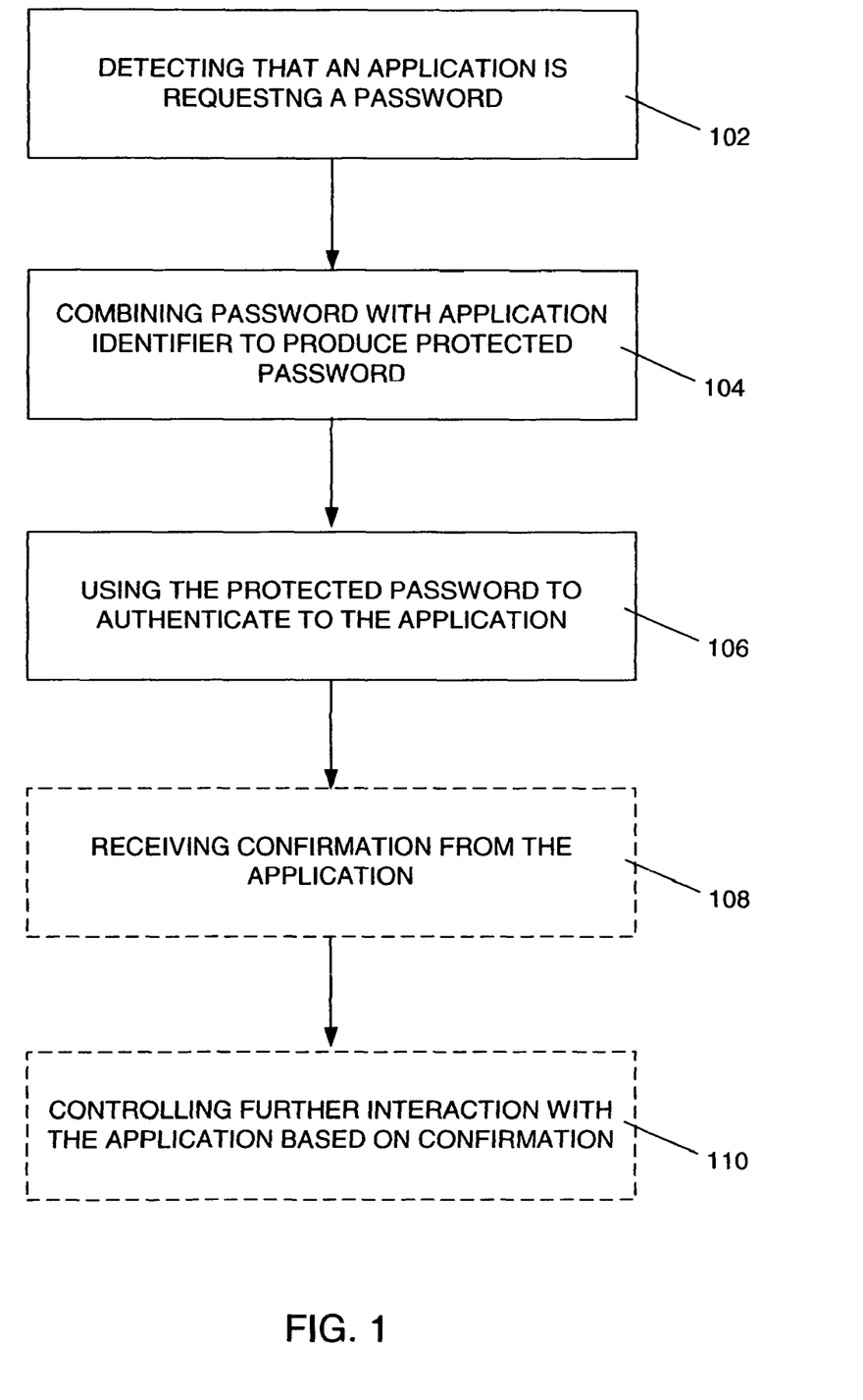
FIG. 1 shows a flow diagram of one embodiment of a password-protection module according to the present invention.

One embodiment of a password-protection module is a method comprising the following steps, as shown in FIG. 1:

1. Detecting 102 that an application is requesting a password (or a passphrase) from a user.
2. Combining 104 the password with a value identifying the application and potentially other information to produce a protected password.
3. Using the protected password to authenticate 106 to the application.

The application then verifies whether the protected password is correct. Examples of applications to which this embodiment may be applied include Web-based services, such as on-line merchants and portals, desktop-based applications, such as virtual private network (VPN) or wireless LAN clients, and traditional client-server applications, among others; as well as applications running on a device (e.g., smart card, security token) connected to the user's computer.

Other embodiments may also perform the following two additional steps:

1. Receiving 108 a confirmation value from the application, and
2. Allowing or preventing further interaction 110 with the application, depending upon the confirmation value of step 4.

Detecting Password Requests—Many applications may request passwords in a user's daily experience with a computer. Some applications will be trustworthy, while others may not be. Moreover, the user and the user's computer may not be able to reliably distinguish between trustworthy and non-trustworthy applications. Indeed, the trustworthiness of a given application may change over time; for instance, an attacker may have compromised an application's security.

However, although a computer may not be able to reliably determine whether a particular application is trustworthy, with typical user interfaces a computer can generally detect when an application is requesting a password from the user. Indeed, in many current operating systems, the interfaces between the user and an application are well defined, and users have come to expect requests for passwords (or any other data) to be presented through these interfaces. Examples at present include dialog boxes and Web forms. An authorized user or administrator can readily install filtering software on the user's computer that tracks user interactions with applications. Such filtering software assists the user in completing forms, for example, and can also protect passwords provided by the user, as described further herein.

In one embodiment, the password-protection module detects that an application is requesting a password by, for example, monitoring the information that the application presents to the user, e.g., the fields of a dialog box or a Web form. This requires some care, as a phishing attacker may attempt to present forms that persuade the user to enter sensitive data, yet escape detection by an interface filter. For instance, the attacker may misspell key words, e.g., "Enter Password," so the filter would need to look for such misspellings as well as the correct words. The attacker may also present images to the user that the filter does not readily recognize, for instance a bit-mapped image that appears to say "Enter Password:" rather than the actual text. In some embodiments, the filter could reject such forms or warn the user if such practices are detected.

Another embodiment employs a more direct way to detect that the application is requesting a password, in particular signaling this fact explicitly to the password-protection module. In this embodiment, the user signals that the application is requesting a password by entering a special control sequence (of one or more sequence elements from a user input device, such as keystrokes on a keyboard) that is not readily intercepted by an application. The Ctrl-Alt-Del sequence in Microsoft Windows is a classic example of such user signaling; this sequence bypasses any application and is signaled directly to the operating system. Other sequences may be appropriate within Web browsers and other application environments. Alternatively, the user could signal the password-protection module by double-clicking on an icon that invokes the module, or by otherwise interacting with a program that communicates with the password-protection module. The password-protection module is configured to respond to signals it receives from the user and to provide password protection accordingly. Depending on usability and security tradeoffs, one embodiment could be set up so that the user enters the sequence or signals the module, either before, after, or during the time that the user is typing the password.

If a one-time password device or other token that interacts with the desktop provides the password (including any of the password types mentioned below), the user could indicate that a password is being requested via the device or token, perhaps by pressing or otherwise activating a control, such as a button or switch. A one-time password device that is connected to the desktop (by for example a wired connection, a wireless interface, sound, or other coupling means) typically interfaces to a device driver on the desktop that reads the one-time password out of the device and provides it to an application. The driver is thus in a position of detecting the user's indication that the password is being requested. The connection of the device to the desktop, e.g., inserting the device into a communications port, could also be the indication that a password is being requested. If the connected device requires the user to present a PIN to it before returning the one-time password, the password-protection module could provide a "trusted path" for the user's entry of the PIN, to ensure that that the PIN cannot be intercepted by a rogue application. In other words, the user would enter the PIN only into the password-protection module, which would authenticate the user to the device. The PIN could be provided directly to the device, or protected with the techniques described herein. Biometric information and other factors for authenticating the user to the device could also be processed through the password-protection module. (In fact, the password-protection module could protect a more general interaction with a device than just optionally authenticating to the device and obtaining a password from it. For example, the device could authenticate to the application by other methods than a password, such as a challenge-response protocol based on a shared secret, or a protocol involving public-key cryptography. The device could also authenticate a transaction, for instance with a digital signature or message authentication code. The protection module invoked in this case would protect the user's interactions with the device by providing a trusted display for information entered by the user and/or processed by the device, e.g., the user's PIN or biometric data, the application identifier, the transaction data, the time, etc.)

A button on a connected one-time password device or other token is not required to achieve the benefits of this invention, however. A password-protection module, upon detecting that an application is requesting a password could then check for the presence of a connected device and, if one is present, read the one-time password from it and provide it to the application. The user may indicate consent by the action of clicking "OK" at some point; this would prevent an application from surreptitiously obtaining a protected password without the user's knowledge. (Note, however, that even if a rogue application does obtain a protected password, the techniques described below make it difficult for that application to impersonate the user to other applications.) Alternatively, the user could indicate to the password-protection module via a control sequence that a password is being requested, as suggested above; the password-protection module would then read the one-time password from the device and provide it to the application.

Implementing the password-protection process as part of a separate module is necessary to keep untrustworthy applications from directly obtaining the user's password. It is not sufficient just to build the protection into trustworthy applications. Rather, the protection must somehow be built into the non-trustworthy applications. Since the non-trustworthy applications by definition cannot be trusted to include password protection, and because the user and the user's computer as noted above may not be able to distinguish between trustworthy and non-trustworthy applications, password protection must be inserted somehow between the user and the application. This is the motivation for the password-protection module tracking user interaction related to passwords and processing passwords received from the user.

Password Types—The password is preferably a one-time password, examples of which include, among others:
   A passcode consisting of a PIN and a time-varying tokencode displayed on or otherwise provided by a one-time password device, where the tokencode is generated as a function of a secret seed stored in the device and a string representing the current time. This approach is employed in RSA Security's SECURID product family.
   A passcode consisting of a PIN and an event-synchronous tokencode displayed on or otherwise provided by a one-time password device, where the tokencode is generated as a function of a secret seed and a counter value.

A passcode consisting of a PIN and a response value generated as a function of a challenge string and a secret seed stored in a device.

A passcode delivered to a mobile device such as a cell phone in the user's possession.

A one-time password consisting only of a time-varying or event-synchronous tokencode, or only of a response value, and not consisting of a PIN, may also be employed. In this case, the user may but need not separately enter a PIN, biometric or other means of authentication to authorize the device to provide the tokencode or response value. Alternatively, the one-time password may be obtained by combining the PIN and one of the values just mentioned. The methods here can also be applied to static passwords and other secret values shared between the user (or the user's device) and the application server or the authentication authority.

Application Identifier—Given the password, the next step is to combine the password with a value identifying the application. This value should be a string that is reliably associated with the application, so that it is impractical for an untrustworthy application to associate itself with a value identifying a different application. Examples of such values include:

The Web address (i.e., URL) to which the protected password is sent.

The IP address of the application.

The distinguished name in the application's certificate, where the application's public key is employed to encrypt the session between the user's computer and the application.

Other possible values include the application's public key, and hashes and/or combinations of the foregoing. The important feature is that it is impractical to impersonate a different application. For instance, although not impossible, it is difficult for an untrustworthy application to obtain traffic directed to another application's Web or IP address, especially if that traffic is encrypted with the other application's public key.

A public key is a particularly beneficial choice since it does not rely on the underlying routing or naming infrastructure for security. If the session is encrypted with a given public key and the same public key is also employed as an identifier, then the attacker is trapped between two difficult situations: either assert the legitimate application's public key and be unable to receive the correct protected password, since it is encrypted with the application's public key; or assert the attacker's own public key but receive an incorrect protected password.

Although an untrustworthy application may well present an interface that appears to be similar to some other application (the classic phishing attack), it will have to present its own identifier (Web address, IP address, etc.) to the user's computer, otherwise it will not be able to receive the protected password at all. With an appropriate combination process as described next, the untrustworthy application's identifier will therefore be embedded in the protected passwords it receives from computers that implement the password-protection module, and the application will not be able to impersonate the user to other applications.

Combination Process—The combination of the password and the application identifier effectively "commits" the password to that application. Let P be the password and let $ID_A$ be the application identifier for application A. The protected password, $P_A$, is computed as $$P_A = f(P, ID_A),$$

where f is the combination function (a hash function, for example). Some embodiments may include other inputs to the combination function as well.

One goal of the combination process is to make it difficult for an application to recover the password from the protected password during the time that the password is valid. That is, it should be difficult, given $P_A$ and $ID_A$, to recover P. For this reason, a one-time password is preferable to a static password, since a one-time password is typically valid only for a short time. A passcode based on a time-varying tokencode, or on the response to a challenge, is perhaps most effective in this regard, since the validity period is quite small. A typical time-varying tokencode is valid for perhaps a few minutes to allow for modest clock skew between the one-time password device and the verifier; a response to a given challenge is valid for perhaps even shorter, according to the time-out period during which the verifier will accept responses to that challenge. A passcode based on a counter may be valid longer, since the verifier only updates the range of acceptable counter values in response to authentications by the user, which may occur only occasionally.

A static password, on the other hand, typically has a relatively long validity period (perhaps several months), even if the user is in the habit of, or under a requirement to, change it. Since users often employ the same password with multiple applications, a recovered password may present a risk of user impersonation even beyond the time that the user first changes it for one application.

For usability reasons, a password will generally be somewhat shorter than would be appropriate to construct a cryptographic-strength key. For instance, a typical one-time password may consist of 12 decimal digits (six digits for the PIN, six for the tokencode or response). This is comparable to a 40-bit symmetric key. Generally, cryptographic-strength keys should be at least 80 bits long, corresponding to a 24-digit passcode, and that is probably too long for most users to enter conveniently and reliably. (Indeed, if users could conveniently and reliably supply cryptographic-strength keys, then much of the motivation for password-based security would be diminished. More conventional protocols based on symmetric or public-key cryptography could be directly employed, without a special design required to accommodate shorter passwords.)

Another goal of the combination process is to make it difficult to obtain a protected password corresponding to a different application identifier during the time that the password is valid. That is, it should be difficult, given $P_A$ and $ID_A$, to obtain the protected password PB for some application B, i.e., $P_B = f(P, ID_B)$. This is possibly a stronger goal than the first one, since it is conceivable that one could compute a new protected password $P_B$ without necessarily recovering the password P.

There are several ways that the password and application identifier can be combined. A simple approach is to apply a cryptographic hash function, such as SHA-1. In this case, one might compute $$P_A = SHA\text{-}1(P \| ID_A),$$

where $\|$ denotes concatenation. Alternatively, one might employ a message authentication code such as HMAC-SHA-1, where P is the key and $ID_A$ is the message. (The SHA-1 function was recently shown to be weaker than expected in terms of collision-resistance. However, it remains strong in terms of its one-way property as well as its pseudorandomness, which are the relevant criteria for generating a protected password. In any case, SHA-1 is only one example that happens to be commonly deployed today. Implementations may well choose other hash functions and/or constructions such as HMAC should other aspects of SHA-1's security become a concern.)

The use of a one-way function on one-time passwords bears some resemblance to the disconnected authentication concept based on hashed passcodes (see, for example, U.S. Patent Application No. 60/502,546, filed Sep. 12, 2003). However, the overall methods and goals are quite different. For one, the protected passwords here are calculated by the user's computer at the time of authentication, and then verified separately by the application in real time. In disconnected authentication, however, the hashed passcodes are calculated by the authentication authority ahead of time, and later verified by the user's computer during authentication. For another, the concept of "pepper"—additional random inputs that must be guessed during verification—plays an important role in disconnected authentication in speeding up the generation of hashed passcodes, but here is not involved (although it could be, to reduce the burden if the user's computer is relatively slow). Also, the application identifier plays an important role here, whereas in disconnected authentication one is not required.

To make it more difficult to recover the password, it is preferable that the function f takes a relatively long time to compute (although not so long as to impose a burden on the user's computer or the application server). One method of increasing the time to compute the function f is to introduce an iteration count (for instance as described in [RSA99] within the password-based key derivation function PBKDF2. The larger the iteration count, the longer the function takes. Likewise, the larger the count, the longer it would take for an attacker to recover the password P from the protected password $P_A$, which is the only approach available to the attacker assuming that the function is one-way, as designed.

As an example of the tradeoff, suppose that it takes one second on the user's computer to evaluate the function f. (This can be achieved, say, by calibrating the iteration count for PBKDF2 according to the speed of the user's computer. One second is a reasonable amount of time on the user's computer if the user just has been typing in the password, which likely takes much longer; the targeted time can be adjusted as desired.) If the application runs on a computer that is 10 times faster, then it will take 0.1 second to verify the password (see below for further discussion on verification). However, for an attacker, the work factor will increase by a factor of $0.5 * 10^{12}$, assuming 12-digit passwords as discussed above. This is because the attacker on average must try half the possible passwords to see which one works. If the attacker has 1000 computers, each 100 times faster than the user's computer, then it will take $1/100,000$ seconds to verify each password guess, and thus about 5 million seconds, or about two months, to recover the password. By then, the password will hopefully have long been invalid (at least if it is a one-time password)—and the attacker will have expended considerable resources to no avail.

Although longer passwords are preferable to shorter ones, even a relatively short password can be a significant deterrent to an attacker. For instance, suppose that the password is only 6 digits long. With the same resources available to the attacker as in the example above, it would take only about five seconds to recover the password. This is fast enough for a real-time attack. But the amount of computation is probably not economically justified if only a one-time password is recovered; the attacker would be better off applying these substantial computational resources to other purposes, or mounting a phishing attack against unprotected passwords. Moreover, if mutual authentication is involved as suggested below, the password-protection module could have a timeout mechanism whereby it drops a session if mutual authentication is not completed within some small time period. Or perhaps the user will just walk away safely from the session if the response takes too long.

Note that if the one-time password includes a PIN, as in the case in the example with 12 digits just given, an attacker who recovers the password also recovers the PIN. If the PIN has a long validity period, then the attacker would have an advantage in recovering later passwords including that same PIN. But even if the PIN does become known to the attacker and is still valid later, all this work will have taken the attacker a considerable amount of time—and the attacker still wouldn't have a valid one-time password! The attacker might try to guess it, but the guess can only be verified by interacting with a correct application server or with the authentication authority, and this will have a low probability of success.

Alternatively, the attacker might try to get a new password from the user, and then leverage the knowledge of the PIN to shorten the time to recover the rest of the one-time password (this would take about five seconds using the example figures above, which is generally within real time). But getting a new password from the user is by no means straightforward. During the months it took to recover the PIN, the attacker's untrustworthy application may well have become noticed by some cautious user, reported to authorities, and then added to the list of untrustworthy applications known to every user's computer, much as virus protection software is readily updated today when a new virus is detected.

The trial-and-error method outlined above whereby an attacker recovers the password from a protected password assumes that there is only one password corresponding to a given protected password. This is likely the case if the protected password is somewhat longer than the password itself; if the protected password is the same length as the password, there would typically be at most a small number of matching passwords. If the protected password is shorter, however, then there may be more than one password that works. This will leave the attacker with some uncertainty as to which password to apply when constructing a new protected password to forward to a different application. As an example, suppose that the password is 12 digits long and the protected password is only six digits long. Then there will be, on average, $10^6$ passwords that work for every protected password. The attacker will have a chance of about one in $10^6$ of choosing the correct password when constructing a new protected password. This is the same as the attacker's probability of just guessing the protected password itself correctly. One-time passwords help significantly to deter attack in this case, because new protected passwords will have a completely new set of possible passwords.

The tradeoff, of course, is that the 1-in-$10^6$ probability of guessing a protected password may itself be considered too high. However, there is a wide set of options depending on the number of digits in the protected password.

One method of obtaining a shorter protected password is to truncate the output of the one-way function. Another, particularly applicable when the one-time password includes a static PIN, is to apply the one-way function only to the variable portion of the one-time password, and then combine the output of the one-way function with the PIN, e.g., by exclusive-or. For example:

$$P_A = SHA\text{-}1(\text{variable portion} \| ID_A) \text{ xor PIN},$$

where the output of SHA-1 is truncated to the same length as the PIN. The combination process is similar to the functionality in the RSA Security's SECURID PINPad token (see, for example, U.S. Pat. Nos. 5,023,908 and 5,168,520) where the PIN is entered into the token and is added there to the time-varying tokencode. A third method is to apply the one-way function to the PIN and the application identifier, then exclusive-or with the variable portion:

$$P_A = SHA\text{-}1(PIN\|ID_A) \text{ xor variable portion.}$$

Combining the application identifier and the password is a very practical way of obtaining different protected passwords for different applications, because the combining process takes place in the password-protection module, not in the device that generates the password. Accordingly, no modifications or special interfaces to that device are required. A quite different approach is contemplated in U.S. patent application Ser. No. 09/304,775, filed May 4, 1999, where the application identifier is combined by the device with a seed stored in the device or with information derived from the seed, and where the password presented to the application is obtained or derived from the result of the combining process within the device.

Verification Process—After the application receives the protected password, it must determine whether the password is valid.

Two basic architectures may be considered: First, where the application itself is able to compute the password (assuming the application is the correct one with which the user shares the password), and second, where the application relies on an authentication authority for verification. In the first described architecture, the verification doesn't need to be done on the same computer as the application is run, but both are still under control of the same organization, and the verification is done only for that application. In the second, the verification supports multiple applications.)

If the application itself is able to compute the password P, then the application can simply recompute the protected password $f(P, ID_A)$ and compare it to the value $P_A$ provided by the user's computer. If the values match, then the password may be considered valid.

In the case that several passwords are valid at a given time (e.g., when multiple time-based token-codes are allowed within a clock synchronization window), the application can try each one to see if any matches the value $P_A$. This is a general observation that may be applied to many of the protocols described herein. The application can then update its internal records as to which passwords have been used and which ones are still allowed.

The function f is assumed not be invertible, since otherwise an attacker who intercepts a protected password would be able to recover the corresponding password from it. Accordingly, the preferred approach for verification is to re-compute the set of potentially valid protected passwords and compare to the provided value $P_A$.

In the case that the function f includes an exclusive-or step, as suggested above, however, the exclusive-or step can be reversed. This may facilitate a faster verification operation. For instance, using one of the examples above, the verifier could compute SHA-1 $(PIN\|ID_A)$ once, then exclusive-or it with the protected password to obtain the purported variable portion. That portion could then be checked against the set of valid values at the time of authentication. Since exclusive-or is more efficient than hashing (particularly if the hashing operation is also iterated), the additional effort at the verifier can be substantially reduced compared to a separate evaluation of the function f for each password.

Note that if the application does not know the correct password, i.e., it is not the correct application, then the application will not be able to re-compute the protected password, and hence will not be able to verify whether the password is correct. This fact is exploited further in the discussion below about mutual authentication.

If the application relies on an authentication authority for verification, then the application would forward the protected password to the authentication authority. The authentication authority would then verify the protected password as just described, where the application identifier $ID_A$ would be the one corresponding to the application that forwarded the protected password for verification. Multiple applications could share the same authentication authority; protected passwords would be verified with a different application identifier for each one. This gives a nice separation among the protected passwords for different applications, and also introduces a level of fraud detection—if an application is found to be frequently forwarding protected passwords that don't work for that application, but do seem to work for some other application, this could indicate that the other application is misusing the protected passwords supplied to it. (A phishing application that is unaware that a user's password is being protected would be of this type, and the fraud algorithm just need to check a list of known phishing applications to determine which one had requested the password from the user.) In effect, the authentication authority is providing the functionality of a dynamic "trust list" by deciding whether or not to verify the protected password on behalf of a given application. The authentication authority can indicate its approval via the mutual authentication process described next.

Mutual Authentication Process—Preferably, the trusted password-protection module in the user's computer will not allow further information to be sent from the user's computer to the application until the requesting application has demonstrated its authenticity to the user's computer. The demonstration of authenticity is selected so as to ensure that the requesting application is entitled, or provisioned, to interact with the user. As noted above, this demonstration may be difficult to achieve based on the application's name alone (in conjunction with a secure session such as SSL/TLS) because of the difficulty of managing a trust list. However, the application's knowledge of the password leads to a much more practical approach.

If the user's computer were to send an unprotected password directly to the application—even a one-time password—then the application would immediately be able to learn the password, whether or not the application is the correct one, and whether or not it is trustworthy. In such case, the application's demonstration to the user's computer of its knowledge of the password would not provide any assurance to the user's computer that the application is the one with which the user shares the particular password. Rather, it would only demonstrate that the application now knows the password, whereas the goal is to show that the application knew it prior to the interaction with the user.

However, if the user's computer provides a protected password, then as described above, an untrustworthy application is not able to determine the underlying password in real time. Accordingly, the application's demonstration of its knowledge of the password does provide assurance that the application shares the password with the user, i.e., that is it is the correct one and that it is safe for the user to continue to interact with the application.

One method of achieving this mutual authentication is for the application to send the password itself back to the user's computer as a confirmation value: The application returns a confirmation value $C_A$ where $C_A=P$ If the password is a one-time password that is entirely variable, its transmission in the clear need not have any security consequences. However, if the password also contains a PIN, then it is preferable to transmit the password through an encrypted channel (e.g., one established via server-authenticated SSUTLS). Alternatively in that case, only the variable portion of the password might be returned. Note that a "man-in-the-middle" phisher is unable to provide the confirmation value, since the phisher does not have the correct protected password.

As a variant of the foregoing, the confirmation value could be a portion of a "next" one-time password. This variant shares some of the usability issues of the prior art approach mentioned above where a next password is returned in response to a successful authentication. However, it has the security advantage that a "man-in-the-middle" phisher is unable to obtain the next password and impersonate the application to the user.

In other contexts and for other reasons it may prove preferable instead to demonstrate the knowledge of the password P indirectly. As an example, the application could send as a confirmation value $C_A=h(P)$ for some function h, with suitable characteristics, e.g., being one-way but easily computed by the password-protection module.

For instance, if the function f involves the computation of some number of iterations of a hash function, as suggested above, then the function h could be defined as the result of one fewer iteration of the hash function. This has the advantage that if the confirmation value were intercepted, considerable work would still be required to solve for the password. The password-protection module can record this value when it is first encountered in the course of calculating the protected password $P_A$, and then compare it to the received confirmation value $C_A$. Likewise, the application can compute $C_A$ and $P_A$ in successive iterations.

As other examples, the application could compute $C_A=g(P,ID_A)$, where g( ) is a different function than f, such that it is difficult to obtain g (P, $ID_A$) from f (P, $ID_A$), or perhaps both $P_A$ and $C_A$ could be computed with the same function f but with different inputs derived from P and $ID_A$. Or, both $P_A$ and $C_A$ could be derived from the output of the same function with the same inputs, or computed as different portions of a longer output of the same function with the same inputs.

As an alternative to storing $C_A$ in the "one-fewer-iteration" approach above, one embodiment of the password-protection module would instead verify $C_A$ by just applying the last iteration of the hash function and comparing the result to a stored $P_A$ value. However, this needs to be done carefully; in particular, both the $C_A$ and the $P_A$ values need to be long enough to prevent real-time trial-and-error attacks as well as attacks involving pre-computation. Thus, the alternative is not recommended if the protected password has been truncated to a much shorter value, e.g., to six digits as suggested above.

Yet another possibility is for the application to derive a key from the password P and send a message with a message authentication code (MAC), where the MAC is computed with the derived key. The ability to agree on a key derived from P can be useful in scenarios where a session key is needed, e.g. when privacy is needed in subsequent communication. For instance, if other sensitive data is to be provided to the application, that data could be encrypted with the key. It should be noted that this key can be derived even though the authentication method itself, i.e., the underlying (one-time) password mechanism, does not directly generate session keys. However, the cryptographic strength of this key may not be as great as desired due to limitations on password length. Accordingly, the key should generally only be viewed as supplemental to other encryption keys. It is possible, for instance, to combine this key with keys generated, e.g., in SSL/TLS. More generally, the mutual authentication could involve a zero-knowledge password protocol or password-authenticated key exchange protocol such as EKE or SPEKE mentioned above, or another mutual authentication protocol such as the SHAKE protocol.

As with the process of verifying the protected password, there are two basic architectures to consider. On the one hand, if the application itself is able to compute the password, then the application can also compute the confirmation value. On the other, if the application relies on an authentication authority to compute the password, the authority can also compute the confirmation value. This has the further benefit that the authority either provides or withholds the confirmation value based on its own policy, and thereby affects whether the password-protection module allows the user to continue interacting with the application. (An example of a policy might be the time of day that interaction is allowed.) In effect, the user gets a real-time authorization check on the application essentially for free, without much of the complexity of other methods proposed for this purpose such as PKI.

Another variant is to hash a random pepper value together with the password as the protected password, and have the application return the pepper value as the confirmation value. For example, the protected password may be defined as $P_A$=h (P, $ID_A$, pepper), and the response as $C_A$=pepper. The application sending back the pepper demonstrates that the application knows the password P.

It is important to emphasize that sensitive user information will be protected from disclosure only if the user is prevented from providing further information to an untrustworthy application until the untrustworthy application has authenticated itself to the user's password-protection module. The mutual authentication described above is thus an important step in defending against phishing attacks.

Mutual authentication can be integrated into the user's computer in various ways. If the user enters the password via a dialog box or form, and the action of clicking "OK" causes the password to be sent to a designated application, then the password-protection module could intercept the response to the "OK" message and check for the correct confirmation value. If the confirmation value is incorrect, the password-protection module can warn the user. Another approach is possible if the user signals the password-protection module via a control sequence, as suggested earlier: In this case, the password-protection module could "pre-authenticate" the application by performing the mutual authentication exchange with the application immediately, rather than waiting for the "OK" message, and perhaps employing a separate protocol with a reserved port at the application server. If the mutual authentication succeeds, then the user would be allowed to continue; if not the user would be warned and perhaps not allowed to continue.

More generally, the password-protection module could "lock" the application interface, so that the user is unable to provide more input to the application, until a correct confirmation value is received.

Note that it is not enough for the application itself to indicate to the user that the user has been successfully authenticated, because the application may be untrustworthy. The password-protection module provides a "second opinion" that is more trustworthy, and should become the primary means by which the user decides or is enabled to proceed with further interactions with the application. Moreover, the password-protection module indicates success only if the user has provided the correct password and the application has returned the correct confirmation value. Thus, a "failure" indication could be the result of the user providing an incorrect password, or it could be due to an untrustworthy application. "Authentication failed" is therefore an appropriate message from the password-protection module covering both cases. The user can try again, but after some number of unsuccessful attempts, the user or the password-protection module should conclude either that the user doesn't have the right password (or device)—or that the user is interacting with the wrong application.

Variations—Other embodiments include one or more variations of the basic concepts described herein. The embodiments described to this point have presented the password-protection module as part of the user interface on the user's computer, so that it tracks requests for the user's password. As one alternative embodiment, the module could be implemented at the network layer, monitoring network messages that appear to relate to password requests. It may be somewhat more difficult in this case for the module to detect when a password request is about to occur; for instance, an untrustworthy application may encrypt or otherwise obfuscate its network messages to conceal its intentions (much as computer viruses are known to employ encryption). Also, a network-based approach may not be able to track requests for passwords from desktop-based applications. However, as phishing attacks are primarily performed by network-based applications that employ common protocols, e.g., Web forms, the network-based approach may be sufficient. This approach would need to be done at or above a transport security layer such as SSL, so that the unencrypted data is visible for inspection.

As another alternative, the module could be implemented as an agent on another computer through which the user's computer connects to a broader network. For instance, an Internet service provider (ISP) could implement the password-protection module on the ISP's computers, much as Web site filtering and spam protection are often included in an ISP's offerings. The appeal of this approach is that the user's computer would not need any new software. However, the approach may be complicated by end-to-end encryption such as SSL between the user's computer and an application on the network.

Another variation is for the password-protection module to be aware to some extent of which applications are trustworthy and which are not. Some applications may clearly be trustworthy, as established perhaps by an administrator or the user; and some may clearly not be. The ones that are clearly trustworthy may not even need the password protection as described here, and the ones that are clearly not so might not even be allowed to interact with the user. The middle ground is the difficult part: applications that the user desires to interact with, whose trustworthiness is unknown. For these applications, the password-protection module provides a kind of "safety net": the user can still provide a password, but if the application turns out not to be trustworthy, the password protection serves as a countermeasure against potential attack.

Also, the protected password itself does not need to be provided directly to the application. Instead, it may be used in place of the password, the same way the password is used in other protocols. For instance, in some authentication protocols a key is derived from a password, and the key is employed to compute a message authentication code on messages exchanged between the user's computer and the application. The protected password could be used instead of the password in such a protocol without changing the protocol flow. (Many protocols may be considered in this context, including the ones mentioned previously such as MS-Chap, zero-knowledge password protocols and password-authenticated key exchange protocols such as EKE and SPEKE, and other protocols such as SHAKE; the protected password can be used in any of these if desired.) If several passwords are valid at a given time, then each one could be tried, although depending on the protocol this may involve additional exchanges between the user's computer and the application.

Although the combining function f has been described as a one-way function, it could also be a trapdoor one-way function in some cases, if the trapdoor is only available to trustworthy applications. (See the variant below where a private key is given to a trustworthy application for further discussion in this vein.)

In addition, it is possible that a password, even though itself "one-time," could be employed to generate more than one protected password. That is, the password-protection module could generate multiple protected passwords $P_A, P_B, \ldots$, where $$P_A = f(P, ID_A)$$

$$P_B = f(P, ID_B)$$

$$\ldots$$

corresponding to requests from different applications for the user's one-time password during a given time period. This can be more convenient for a user, who would otherwise need to enter a separate password for each request. Indeed, with time-synchronous one-time password devices, the user may need to wait until the next time interval—perhaps up to another minute—before the next one-time password is displayed.

The password-protection module, since it is tracking the user's interactions, can simply record the user's password and reuse it if it is needed for another application during the same time interval. The user would still typically need to approve the provision of the protected password to the additional application, but wouldn't have to type the password in again.

With an appropriate combining function, this optimization does not result in any reduction of cryptographic security. However, some applications, to be sure that the user is present at the moment the password is requested, may not accept protected passwords derived from a previously recorded password. Additional protected passwords computed with the optimization should therefore be distinguishable from the first protected password that is calculated from a password by the password-protection module; this can be accommodated with an additional flag input to the function f that indicates whether the password is newly entered or not. (For convenience, the flag may also be transmitted along with the protected password.)

For additional protection, it may be preferable for a user to employ different PINs for different applications, while for convenience employing the same variable portion of the one-time password. This is easily achieved by accordingly varying the input to the function f for different applications.

Related to this, multiple passwords could be calculated from the same one-time password for a single application, perhaps by introducing a counter value into the input of the function f.

For the password reuses just described, a one-way function should preferably be applied to all the inputs to the function f, as the special constructions involving the exclusive-or step risk disclosing the PTN if an attacker obtains two protected passwords derived from the same underlying password.

Other additional inputs to the function f may have benefit in some circumstances. The "new password" flag has already been mentioned, as well as the counter. Another input would be some context information (e.g., transaction data, or some other information defining the purpose of the exchange). For instance, a value indicating something about the user's computer could be input to the function. This would have the benefit of binding the protected password to the particular context, which may play a role in an authentication authority's decision of whether to provide a confirmation value to the application. Another example is a value expressing the purpose of the authentication—for instance, transaction data that the user is approving. The authority's decision could likewise be based on the specific purpose. It may also be beneficial to incorporate the user's name as an input to the function.

Another possibility is a salt value, a random value generated by the password-protection module to introduce additional variable into the protected password. Such a salt value would typically be provided to the application together with the protected password, though it could be conveyed in some other way. A salt value is often employed in password protocols for this purpose with the benefit that since the attacker cannot predict the salt value in advance, the attacker can't effectively begin searching for passwords until the attacker has seen the protected password.

An alternative to the user's computer generating the salt value is for a "beacon" to do so. A beacon is a central authority, trusted by the user's computer and the application. The beacon could transmit new salt values periodically for use by many applications and users. These salt values could be self-authenticating, perhaps by including a digital signature and a timestamp, or alternatively by chaining to previously distributed value (e.g., one salt could be the pre-image under a hash function of a prior salt, where the initial salt, the root of the hash chain, is built into the password-protection module and into the application, or otherwise established in an authenticated manner).

As mentioned previously, a pepper value can also be included in the input. Pepper, like salt, can be generated by the password-protection module, but unlike salt, a pepper value is not provided to the application. Instead, the application must recover it by trial and error. This has the effect of increasing an attacker's difficulty without increasing the amount of computation on the user's computer (in contrast to a large iteration count, which increases both). Note that iteration count and pepper may be employed together if desired.

Yet another additional input is a nonce value provided by an application. The incorporation of a fresh nonce gives the application the assurance that the protected password is new and not a replay of a previous value. This can also be achieved to various extents by incorporating a time or counter value as an input, as is well known in protocol design. (Note that the nonce, time or counter value here is combined with the password after the password is generated; these values may be the same or different than those involved in the generation of the password itself, which may also be a function of time, a counter, or a random challenge, depending on the type of one-time password.)

These various additional inputs, as well as an iteration count, can be combined with one another in a variety of ways.

With a large number of users, the burden on the application server or the authentication authority of computing the function f repeatedly may become significant. One way to reduce this burden, while maintaining a level of difficulty for the attacker, is for the password-protection module and the application server or the authentication authority to employ a pepper value that is derived in some way from a previously established secret shared by both parties. (In the following, without loss of generality, the application server is described as the party involved in the processing; but the authentication authority might alternatively or additionally be involved.)

Although it is possible that the shared secret could be preinstalled in the password-protection module, such an approach may involve more administrative overhead than is desirable, especially if a password-protection module is intended to support multiple applications. An alternative to pre-installing the shared secret is to install it after a successful mutual authentication between the user and the application. The successful authentication assures the password-protection module that the application is trustworthy (to the extent that has demonstrated knowledge of the user's password). The shared secret can then be sent by one party to the other over the now-authenticated secure channel, or otherwise derived from values exchanged by the parties and/or from information involved in the authentication exchange itself.

The shared secret is effectively a "hint" that enables the application server to recover the pepper faster than by trial and error, without giving the phisher a similar advantage. Authentications prior to the establishment of the hint would still require the full search for the pepper value (or a large iteration count), but should be relatively less common as users generally authenticate repeatedly from the same computer. For security reasons, a user might only enable such "hinting" on a personal computer—similar to caching application passwords only on one's personal computer. At a shared computer such as an Internet kiosk, which serves many users, it may be preferable not to keep such hints or passwords, but this seems reasonable also since a user would typically not be authenticating frequently from the same kiosk.

Another approach with similar effect is for the password-protection module to provide information from which the pepper value may be derived to the application authority via public-key encryption. In this case, the public-key encryption should preferably be with a public key that is already trusted, e.g., a public key preinstalled in the password-protection module. (Any of a variety of known public-key infrastructure techniques can be employed for managing this relatively limited trust list of public keys. The trust-list management issues discussed above may not be so significant, given the limited number of keys, which are for a single purpose.) The public key would not necessarily be associated with the application, so the application would need to obtain access to the decryption operation through a process described next.

An additional system component, called a pepper server, is preferably associated with the private key and hence the decryption operation.

During an initialization phase, a key pair is generated and the private key is provided to the pepper server. The corresponding public key is provided to the password-protection module as discussed above.

During an authentication operation, a pepper value is generated at the password-protection module and encrypted with the pepper server's public key (via any of a variety of known public-key encryption methods). The pepper value is employed in obtaining a protected password, which is provided to the application. In addition, the encrypted pepper value is also provided to the application.

Now, in order to verify the protected password, the application can either guess the pepper value, or, to avoid the computational cost of guessing, request that the pepper server decrypt the encrypted pepper.

In general, the public key decryption operation will involve less computation than searching the space of possible peppers, so overall the burden is reduced, and the pepper server itself need not become a bottleneck. Furthermore, with appropriate selection of the public-key encryption method, the decryption operation may be amenable to "batch" processing, where multiple decryptions can be computed as a group with less total effort than if they were computed separately.

The pepper server needs some access control to ensure that it only returns pepper values to trustworthy applications. One way to do this, with the usual trust-list challenges, is to keep a list of trustworthy applications at the pepper server. Another way is to require the application to demonstrate knowledge of the password.

In one approach, the password-protection module encrypts the password along with the pepper value. In order to obtain the decryption, the application needs to demonstrate knowledge of the same password.

However, this approach potentially enables the pepper server to learn the password, which may be undesirable.

Another approach is for the password-protection module to encrypt the hash of the password and a salt value along with the pepper. If the salt value is provided only to the application, not the pepper server, and is sufficiently long, then the application can derive the same value, and the pepper server can verify it, without the pepper server learning the password. As one example, define $$x = f(P, ID_A, \text{salt}, \ldots)$$

$$y = g(x, \text{pepper}, \ldots),$$

where f( ) and g( ) are one-way functions and y is long enough so that it is unlikely that there is more than one pepper that matches a given (x, y) pair. The password-protection module encrypts (x, pepper) with the pepper server's public key, and sends the resulting ciphertext, the salt, and x to the application (possibly along with other values). The application re-computes x, then sends x and the ciphertext to the pepper server. The pepper server decrypts the ciphertext, checks that x is correct, and if so returns the pepper value. Finally, the application verifies y given the pepper to authenticate the user (and optionally continues by generating a confirmation value as discussed above).

With either approach, a phisher may try different password guesses against the pepper server to see if one yields the correct pepper. The pepper server can counter this attack by imposing limits on the number of decryption requests for a given ciphertext. The pepper server can also confuse an attacker by returning an incorrect pepper rather than an error message; this may be useful if only a portion of the pepper is recovered in this way and there is still other work to do after the pepper is recovered.

Architecturally, it may be advantageous to have a different "pepper" key pair for each application, to limit the impact if a private key is compromised. Identity-based encryption, where the public key is formed from the application's name, is a convenient way of implementing this approach, since it avoids the need to distribute application-specific pepper keys. However, the same functionality can also be achieved with more conventional public-key techniques. In either case, once each application has a specific public key it becomes reasonable to consider an enhancement where the pepper server, once it trusts an application sufficiently, gives the private key to the application and thereby avoids the need to be involved further in recovering pepper values for that application. (Taking this to an extreme, if the password itself is encrypted with the public key, and the application has the private key, then there is no need for pepper or hashing—a trustworthy application can just decrypt, recover and verify the password. Even then, a "safety net" of password protection can be beneficial in case the trust mechanisms fall short.)

Another way to reduce the application server's burden is to reverse roles: the application generates the pepper value and authenticates first to the password-protection module, which then returns a confirmation value. However, this carries significant additional risk since if the application goes first, anyone can obtain a protected password from the application, for any user, at any time. In contrast, a phisher can only obtain protected passwords from users when they are authenticating mistakenly to the phisher.

One way of reversing roles that may offer adequate protection in some situations is for the application to authenticate with a short hash value, such that only partial information about the password is revealed, and to do so only after the password-protection module has first "committed" to the password, e.g., by sending the hash of the password with a salt value that is not disclosed until later. The commitment ensures that the user has already provided a password before obtaining the partial information (since the user must "decommit" later, typically by revealing the salt value). The partial information provides some assurance that the application server knows or has access to the password, but not so much to enable an attacker to recover the password. By varying parameters, one can trade off between the probability that a phisher is undetected and the probability that an attacker can guess the password. A user may be allowed additional authentication attempts in case the first one is unsuccessful; this provides further parameters for tradeoffs.

Yet another way to reduce the application server's burden, applicable whether it is the result of a large iteration count, or searching for pepper, is for the application server to "outsource" some portion of the computation of the function f and/or the search for pepper to another computer. For instance, an application server could assign work to computers of other users who have recently authenticated to the application server. (Here, mutual authentication is important, to keep a phisher from achieving the same benefit.) This approach can be applied in a variety of settings. For example, in the setup with x and y defined as above, the application could send the pair (x, y) to a user's computer, which would search for the pepper value such that y=g (x, pepper, . . . ), if one exists. If the application doesn't provide the correct x, then the user's computer most likely won't find the correct pepper. Of course, with this approach one needs to take care that the user who is helping with the computation isn't an attacker who is collecting x values from the application server, as they can help an attacker recover the password. But with a large enough population of users, it will be difficult for the attacker to ensure involvement in any particular computation.

In the description of the basic verification process above, it was assumed that either the application server or the authentication authority is able to compute the password P, and thereby verify the protected password $P_A$. However, it is not strictly necessary that either store or be able to compute the password P. In particular, instead of storing or computing the password P, the protected password $P_A$ instead could be stored.

If the password is a one-time password, then a set of protected one-time passwords for different times, or events, or challenges, could be stored for each user. The application server or the authentication authority would then verify a protected password by comparing it to a stored value.

If mutual authentication is involved, one or more confirmation value $C_A$ could also be stored. In an optimization, just the $C_A$ values could be stored and the corresponding protected passwords $P_A$ derived from them.

Another approach to mutual authentication is for the application to return as a confirmation value some information readily recognized by the user (though not necessarily by the password-protection module). For instance, the user could initially register answers to "life questions" such as mother's maiden name with the application, where those answers are returned upon successful authentication. Since only the correct application presumably knows the answers, and due to the password protection process, the user has the assurance that if the expected answers are returned, the application is authentic.

The variant where the application stores protected passwords naturally supports the situation where multiple applications each store a set of protected passwords, corresponding to the respective $P_A$, $P_B$, . . . values. An authentication authority could then "provision" the various application servers with protected passwords, to be used as needed.

The advance provisioning of protected passwords to a server assumes, of course, that the protected passwords can in fact be computed ahead of time. If they depend on values that are not predetermined, such as a nonce or salt, then the pre-computation can be modified to accommodate this dependence. In particular, the protected password $P_A$ may be defined with two levels of functions as:

$$P_A = f_2(f_1(P, ID_A, \ldots), \ldots).$$

Only the output of the inner function $f_1()$ is pre-computed and stored at the application server. Additional inputs to the inner function $f_1()$, if any, need to be known in advance to the authentication authority to facilitate pre-computation, but additional inputs to $f_2()$ do not. Thus, $f_1()$ may include a salt value generated by the authentication authority and stored at the application server (and later provided to the user's computer), while $f_2()$ includes a salt value generated by the user's computer, and subsequently provided to the application server. The inner salt protects the password against pre-computation attacks by an attacker who compromises the application server's storage; the outer salt protects it against an attacker who phishes a user for a protected password.

As an alternative to storing and/or provisioning the various protected passwords (i.e., $P_A$, $P_B$, etc.), the application server or the authentication authority could employ something by which the protected password may be verified, such as a hash of the protected password. Instead of comparing the protected password to the stored value, the application server or the authentication authority would check whether the values are consistent, e.g., whether the hash is correct. This has the advantage of protecting against compromise of the stored values; an attacker would not directly be able to impersonate the user to a compromised application server without further computation. Similar protections against compromise are afforded in U.S. Patent Application No. 60/502,546, filed Sep. 12, 2003, via the storage of one-time password hashes on the user's computer. One way to facilitate the pre-computation of this kind of verification data, while still being able to incorporate a salt value at the user's computer, is to employ the beacon approach mentioned above. The beacon salt values could be obtained slightly ahead of time in order to pre-compute the verification data.

It may also be desirable to conceal the confirmation value $C_A$ when mutual authentication is involved; this may be done by encrypting the confirmation value with another value derived from the password in addition to the protected password $P_A$, analogous to the encryption of the Microsoft Windows password via a passcode hash in the above-mentioned U.S. Patent Application No. 60/502,546. More generally, the verification process and storage could be arranged such that that the protected password $P_A$ is verified and the corresponding confirmation value $C_A$ is obtained in a single operation.

In many present systems for password authentication, the password itself is not available to the application server or the authentication server authority. Instead, verification data derived from the password is stored. To facilitate the transition from such systems to the approaches described herein, the protected password may be computed as a function of the verification data rather than the password itself (which may not be available to the application server or the authentication authority). The verification data is typically the result of applying a one-way function to the password and other information such as a salt value or the user's name. This other information and details about the function would need to be conveyed to the user's computer in order for the password-protection module also to compute the verification data and hence the protected password. If some of the information is user-specific, then an additional protocol flow may be needed where the user's name is sent to the application, and then the user-specific information is returned, before the protected password can be sent.

An application's support for protected passwords can be indicated via special hidden fields or similar structures in forms or other data provided by the application to the user's computer. Other information such as algorithm identifiers, protocol version numbers, etc., could also be conveyed in this manner. The fields would then inform the password-protection module that protected passwords are accepted and how they are to be generated. The fields may also "trigger" the password-protection module to prompt the user for a password, although care needs to be taken to ensure that an attacker is not able to simulate the effect with an untrustworthy interface, hence the benefit of the control sequence approach above which could be combined with this triggering. If the fields are not present or are not supported by a given password-protection module, then the user could be warned or prevented from interacting with the application.

Over time, phishers would need to provide the appropriate fields, or otherwise users would be warned or prevented from interacting with them. Once they provide the fields, the password-protection module would then protect the user's password against misuse. If the user is in the habit of invoking the password-protection module in any case, the user will become much less likely to be persuaded to interact with an application that should not be trusted.

The deployment of the password protection techniques described in this note can be gradual. Not all computers and user accounts would need to support it initially. During a transition period, applications could accept ordinary passwords as well as protected passwords. Applications would still be subject to phishing attacks on the ordinary passwords, but could warn users not to enter passwords into applications they do not trust; to look for assurance that a password-protection module is present before entering a password; and to install such a module if one is not present. Over time, protected passwords would become the default for many users, and support for ordinary passwords could then the phased out. Indeed, as password-protection modules become widely available on users' computers, the traditional and risky "username/password" interface could be dropped. Applications would simply say "please authenticate", and users would do the rest via the safer password-protection module.

Finally, the password-protection module may be considered as a special case of a "security assistant" subsystem for users. Such a subsystem could provide information about the reputation and accreditation of an application that is requesting information from the user. This could be done automatically when a user encounters an application, or in response to a user action such as a control sequence. The security assistant could reassure the user when the application is known to be trusted, restrain the user when the application is known not to be, and help the user evaluate the situation when the status is uncertain. The subsystem would effectively provide a "trusted path" for the user to enter and view information, out of the reach of malicious applications. Such a trusted path could also protect the user's interactations with a connected device such as a smart card or security token, which needs to receive information (such as a PIN) from or provide information to the user. Users' confidence can be significantly enhanced by these improvements to their computing experience.

Figure 2:
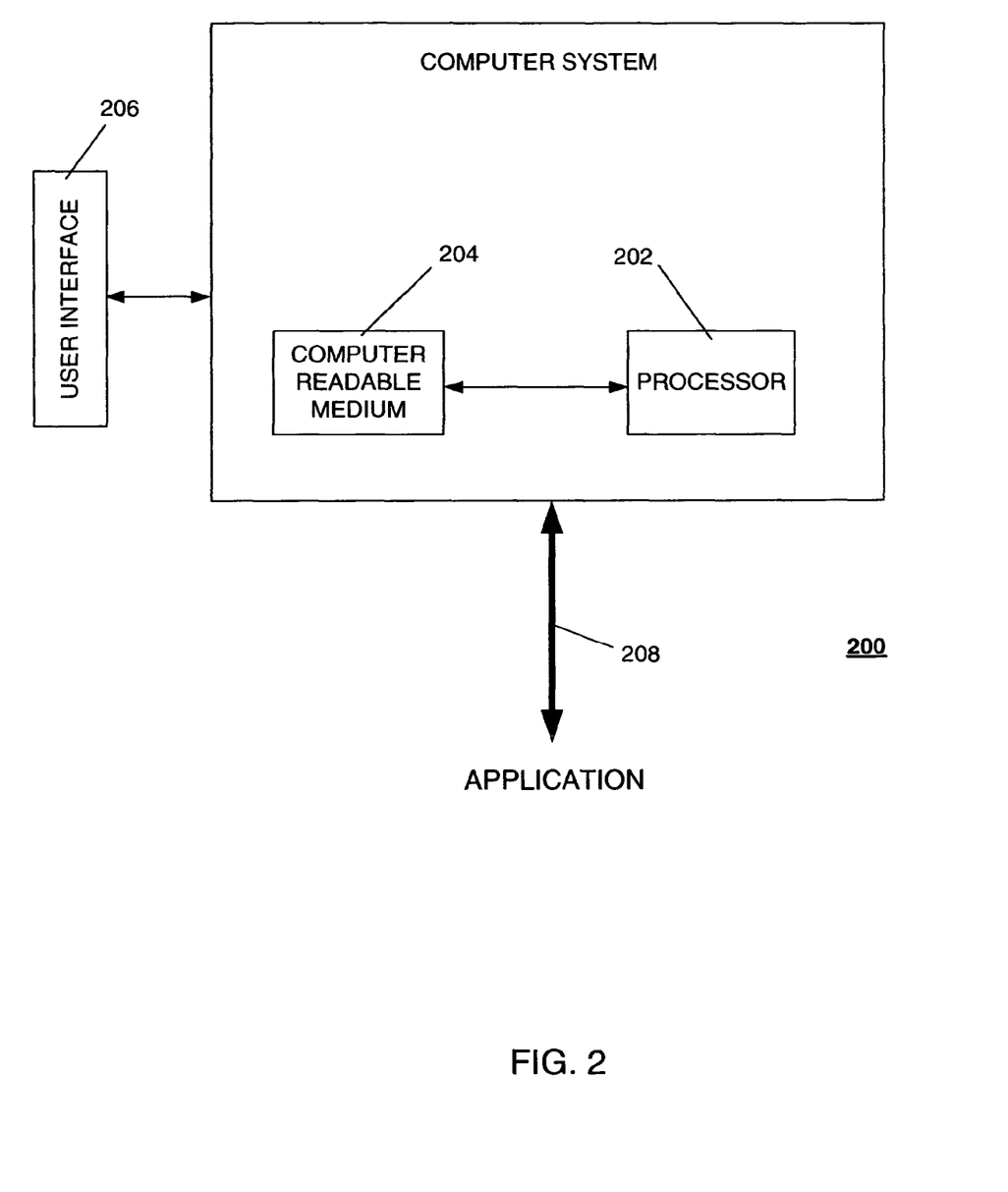
FIG. 2 shows a computer system upon which the embodiments described herein can be implemented.

Implementation—The methods described herein can be implemented on a computer system 200 as shown in FIG. 2. Such a computer system 200 could be a personal computer (e.g., desktop, laptop or notebook), a workstation, handheld computer system or any other computer system known in the art. Such a computer system 200 typically includes a processor 202 for executing instructions that have been stored on a computer readable medium 204. The instructions are adapted to perform various tasks and functions, some of which include the embodiments disclosed herein. The system 200 further includes a user interface 206 such as a keyboard, mouse, device interface, etc., for providing (among other things) notification from the user indicating a request from the application. The system further provides for an interface 208 to an application, either directly or via a network such as the Internet. The methods described herein can be implemented via standard modifications to browsers and/or operating system components. One way to do so is with a web-browser plug-in, as shown for example in FIG. 3.

Figure 3:
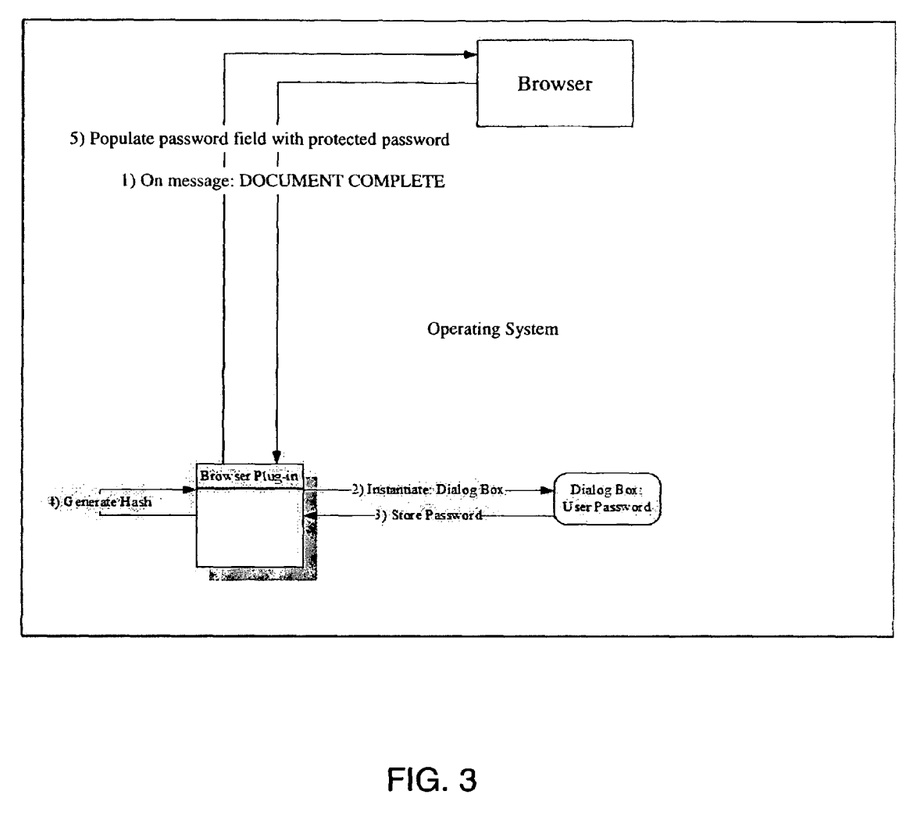
FIG. 3 shows a browser plug-in implementation of a password-protection module embodiment.

In the example embodiment of FIG. 3, before use, the password-protection module plug-in needs to be registered as a well-known component of the operating system. At registration, the plug-in also associates itself with associated events (i.e., form-filling). After this, the plug-in is able to connect with the browser and perform actions based on the messages that it receives.

Whenever a browser window is opened, it will now be aware of the existence of the plug-in, and will invoke it for the registered events. Specifically, the browser may invoke the plug-in for a "Document Complete" event.

When the browser sends a Document Complete message to the plug-in, the plug-in checks if an input of type "password" exists. If so, the plug-in instantiates a modal dialog box (prohibits the user from going back to the browser until data is entered) identifying the plug-in as the password-protection module and asking for the password.

After the user has provided the password, the password-protection module performs the password-protecting operation on the given password to generate the protected password.

The "password" input field is then populated with the protected password, making the protected password available to the application.

Summary—The password-protection module described herein helps to protect passwords, particularly one-time passwords, from interception and misuse by untrustworthy applications. It differs from previous approaches primarily in the following ways.

First, although other approaches may employ detection mechanisms to detect when a password is being requested, the purpose of such detection is to assist the user in providing stored passwords or in filling out forms. The password itself in these approaches is provided to the application, but is not specifically protected against misuse by the application.

Second, although other approaches may combine the password with a value identifying an application (as is a common recommendation in security protocol design), the combination process is not specifically required of all password requests. Certain applications may combine a password with an application identifier, but as noted above, the trustworthy applications do not need the combination process, but the untrustworthy ones do. The integration of the detection mechanism with the combination process fulfills the goal of protecting the password against misuse.

Third, the approach supports a special control sequence for invoking the password-protection module, providing assurance to a user that the password is indeed being protected properly.

Fourth, the approach includes a mutual authentication feature, providing assurance that protected password has been provided to the correct application.

Finally, in contrast to various more complex security protocols, the approach described herein in its basic form has a minimal impact on both the user experience and the protocol flow. The user still enters a password; same as before; and no additional protocol messages are required between the user's computer and the application if only the user is authenticated. (If the application is also authenticated, as in the discussion on mutual authentication above, the "password verified" message from the application to the user's computer in a typical protocol would need to be modified to carry the application's confirmation value; other enhancements may likewise require additional flows in order to achieve a particular benefit.) At the application, only the password verification process needs to be updated in the basic form of the approach.

The password-protection module itself is generic and does not require any user-specific personalization or the storage of any secrets on the user's computer; it is therefore easy to install and extremely portable and scalable, in contrast, say, to a solution requiring a personalized software token on the user's computer.

In effect, the approach can be considered as a better way of providing and verifying passwords. There are many different algorithms in the industry for generating one-time passwords. The improvement described here can bind (at least temporarily) a one-time password generated with any of those algorithms to a specific application to avoid potential misuse.

Other aspects, modifications, and embodiments are within the scope of the claims.

REFERENCES

[Zor00] Zorn, G., "Microsoft PPP CHAP Extensions, Version 2," IETF RFC 2759, January 2000.

[Bel92] S. Bellovin and M. Merritt, "Encrypted Key Exchange: Password Based Protocols Secure against Dictionary Attacks," Proceedings of the Symposium on Security and Privacy, IEEE, 1992.

[Jab96] D. Jablon, "Strong Password-Only Authenticated Key Exchange," Computer Communication Review, ACM SIGCOMM, vol. 26, no. 5, pp. 5-26, October 1996.

[Lar01] J.-O. Larsson, "Higher layer key exchange techniques for Bluetooth security," Open Group Conference, Amsterdam, October 2001.

[RSA99] RSA Laboratories, "PKCS #5 v2.0: Password-Based Cryptography Standard," Mar. 25, 1999.

What is claimed is:

1. A method, performed in a computer processor, of protecting a password being used to establish interaction between a user and an application, comprising:
   detecting, across a user interface, a request for the password from the application by receiving a notification from the user indicating the request;
   combining the password with information identifying the application, so as to produce a protected password; and
   authenticating to the application using the protected password;
   wherein authenticating to the application includes communicating with the application in a challenge-response protocol using a derivative of the protected password;
   wherein the method further includes preventing the user from providing the password directly to the application;
   wherein the derivative of the protected password includes a key generated from the protected password.

2. The method of claim 1, wherein the notification from the user includes entering a control sequence of at least one sequence element from a user input device.

3. The method of claim 1, wherein the notification from the user includes activating a control on a security device that is in communication with a computer platform associated with the user.

4. The method of claim 1, wherein the notification from the user includes establishing communication between a security device and a computer platform associated with the user.

5. The method of claim 1, wherein the information identifying the application is selected from the group consisting of a URL, an IP address, a name in a certificate, and a public key.

6. The method of claim 1, wherein combining the password with information identifying the application includes hashing the password and the information identifying the application.

7. The method of claim 1, wherein combining the password with information identifying the application includes combining additional information with the password and the information identifying the application.

8. The method of claim 1, wherein authenticating to the application includes providing the protected password to the application.

9. The method of claim 1, wherein the password is at least a portion of a one-time password.

10. The method of claim 1, wherein authenticating to the application includes interacting with an authentication authority.

11. The method of claim 1, further including transferring control over user interaction from the application to a password-protection module upon detecting the request for the password.

12. The method of claim 11, further including transferring control back to the application after the protected password is provided to the application.

13. The method of claim 1, further including receiving assurance that the application is entitled to interact with the user.

14. The method of claim 13 wherein receiving assurance includes the application demonstrating knowledge of the password.

15. The method of claim 14, wherein demonstrating knowledge of the password includes communicating with the user via a protocol involving the password.

16. The method of claim 13, wherein receiving assurance includes the application demonstrating knowledge of the protected password.

17. The method of claim 13, wherein receiving assurance includes the application interacting with an authentication authority.

18. The method of claim 1, wherein detecting the request for the password further includes decoding information provided by the application.

19. The method of claim 1 wherein the request for the password from the application is generated in response to the user being subject to a phishing scheme.

20. A method, performed in a computer processor, of protecting a password being used to establish interaction between a user and an application, comprising:
   detecting, across a user interface, a request for the password from the application;
   combining the password with information identifying the application, so as to produce a protected password;
   authenticating to the application using the protected password; and
   determining, based on the password, whether the application is entitled to interact with the user;
   wherein determining whether the application is entitled to interact with the user includes the application demonstrating knowledge of the password;
   wherein the application demonstrating knowledge of the password includes providing a derivative of the password to the user; and
   wherein the derivative of the password is an alternative combination of the password and the value identifying the application, such that the alternative combination is a different combination from the one that produced the protected password.

21. A method, performed in a computer processor, of protecting a password being used to establish interaction between a user and an application, comprising:
   detecting, across a user interface, a request for the password from the application;
   combining the password with information identifying the application, so as to produce a protected password;
   authenticating to the application using the protected password; and
   determining, based on the password, whether the application is entitled to interact with the user;
   wherein determining whether the application is entitled to interact with the user includes the application demonstrating knowledge of the password; and
   wherein the demonstration of knowledge of the password includes deriving a key from the password, computing message authentication code with the derived key, and sending the message authentication code to the user.

22. The method of claim 21, wherein determining whether the application is entitled to interact with the user includes interacting with an authentication authority.

23. The method of claim 21, further including (i) allowing further user interaction with the application if the application is determined to be entitled to interact with the user, or (ii) preventing user interaction with the application if the application is determined not to be entitled to interact with the user.

24. The method of claim 21 wherein the request for the password from the application is generated in response to the user being subject to a phishing scheme.

25. A non-transitory computer readable storage medium including stored instructions, which, when performed by a computer, are adapted for protecting a password being used to establish interaction between a user and an application, comprising:
- instructions for detecting a request for the password from the application by receiving a notification from the user across a user interface indicating the request;
- instructions for combining the password with a value identifying the application, so as to produce a protected password; and
- instructions for authenticating to the application using the protected password;
- wherein the instructions for authenticating to the application include instructions for communicating with the application in a challenge-response protocol using a derivative of the protected password;
- wherein the derivative of the protected password includes a key generated from the protected password.

26. The non-transitory computer readable medium of claim 25, wherein at least a portion of the stored instructions is designated to be a plug-in associated with a browser.

27. The non-transitory computer readable medium of claim 25, wherein at least a portion of the stored instructions is designated to be run as a component of an operating system.

28. The non-transitory computer readable medium of claim 25 wherein the request for the password from the application is generated in response to the user being subject to a phishing scheme.

* * * * *